United States Patent [19]
Hansen

[11] Patent Number: 5,274,972
[45] Date of Patent: Jan. 4, 1994

[54] INSTALLATION DUCT FOR UTILITY LINES

[75] Inventor: Joerg Hansen, Wettringen, Fed. Rep. of Germany

[73] Assignee: Hewing GmbH, Ochtrup, Fed. Rep. of Germany

[21] Appl. No.: 850,748

[22] Filed: Mar. 13, 1992

[30] Foreign Application Priority Data

Mar. 18, 1991 [DE] Fed. Rep. of Germany ... 9103263[U]

[51] Int. Cl.⁵ ............................................. E04B 5/48
[52] U.S. Cl. .................................. 52/220.5; 52/220.1;
52/242; 52/287; 52/288; 52/718.01; 174/48
[58] Field of Search ................ 52/287, 288, 242, 221,
52/718.01, 718.04; 174/48

[56] References Cited

U.S. PATENT DOCUMENTS

| | | | |
|---|---|---|---|
| 2,355,629 | 8/1944 | Carrier | 52/287 |
| 3,473,278 | 10/1969 | Gossen | 52/287 |
| 3,721,762 | 3/1973 | Gooding | 174/48 |
| 5,024,614 | 6/1991 | Dola et al. | 439/114 |

FOREIGN PATENT DOCUMENTS

| | | | |
|---|---|---|---|
| 2110312 | 9/1972 | Fed. Rep. of Germany | 52/288 |
| 1376369 | 9/1964 | France | 52/287 |

Primary Examiner—Carl D. Friedman
Assistant Examiner—Matthew E. Leno
Attorney, Agent, or Firm—Jordan and Hamburg

[57] ABSTRACT

A utility duct for elongated utility members is mountable on a wall structure and includes a retaining strip disposed on the wall structure and a capping member. Upper and lower connectors connect the capping member to the retaining strip to thereby form an internal duct passage for the utility members. The retaining strip has a plurality of supporting walls which together with the retaining strip form gutter-shaped channels for supporting the utility members. At least one of the supporting walls has an outer end formed as a seat which seats against the capping member when the capping member is mounted on the retaining strip by the upper and lower connectors.

6 Claims, 3 Drawing Sheets

INSTALLATION DUCT FOR UTILITY LINES

The invention relates to an installation duct for utility lines, particularly for pipes, cables, etc.

BACKGROUND OF THE INVENTION

Starting out from a baseboard of the aforementioned type, which is known from the German patent 24 58 311, it is an object of the invention to provide an installation duct, which is dimensionally stable even if it is of thin-walled construction, which has manifold uses and offers a visibly attractive surface.

SUMMARY OF THE INVENTION

In the case of the inventive installation duct, the capping is held in its connecting position above the upper and lower connectors in such a manner, that it rests preferably under a slight tension against one or several seats of the supporting walls of the retaining strip. Due to the use of one or several edge plates for supporting the capping, the latter can be constructed with thin walls without losing stability. At the same time, the supporting walls of the retaining strip form separate compartments for separately accommodating utility lines of different type, so that a universal use is possible.

With regard to significant, further advantages and details of the invention, reference is made to the following description and drawing, in which an embodiment of the object of the invention is shown diagrammatically in greater detail.

DESCRIPTION OF THE PREFERRED EMBODIMENTS

Figure 1:
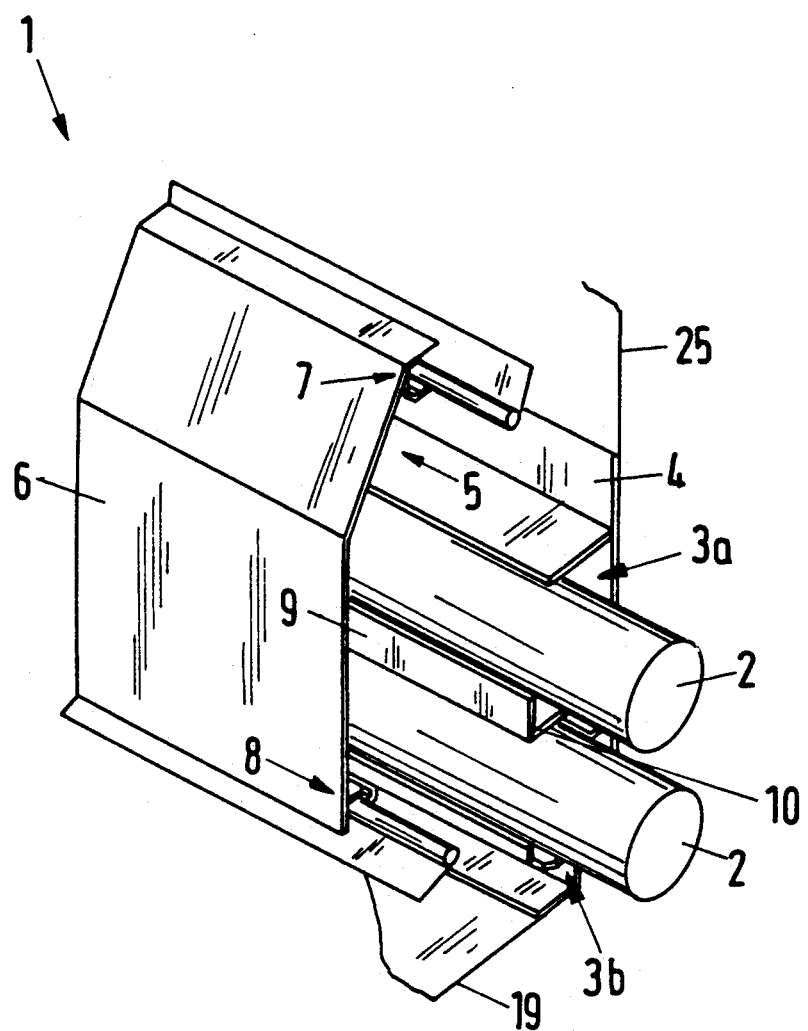
FIG. 1 shows a perspective, partially sectional representation of the invention installation duct with two supply lines.

FIG. 1 shows an installation duct, which is labeled 1 as a whole and consists of a retaining strip 4 and a capping 6. In the example shown, the installation duct 1 accommodates two supply lines 2 in gutter-shaped ducts 3a, 3b of the retaining strip 4. The retaining strip 4 and the capping 6 form the boundary of a cable or pipe duct 5. The capping 6 is connected by means of an upper connector 7 and a lower connector 8 with the retaining strip 4. At the same time, it rests against a seat 9 of a middle supporting wall 10 of the retaining strip 4, preferably under a slight tension.

Figure 2:
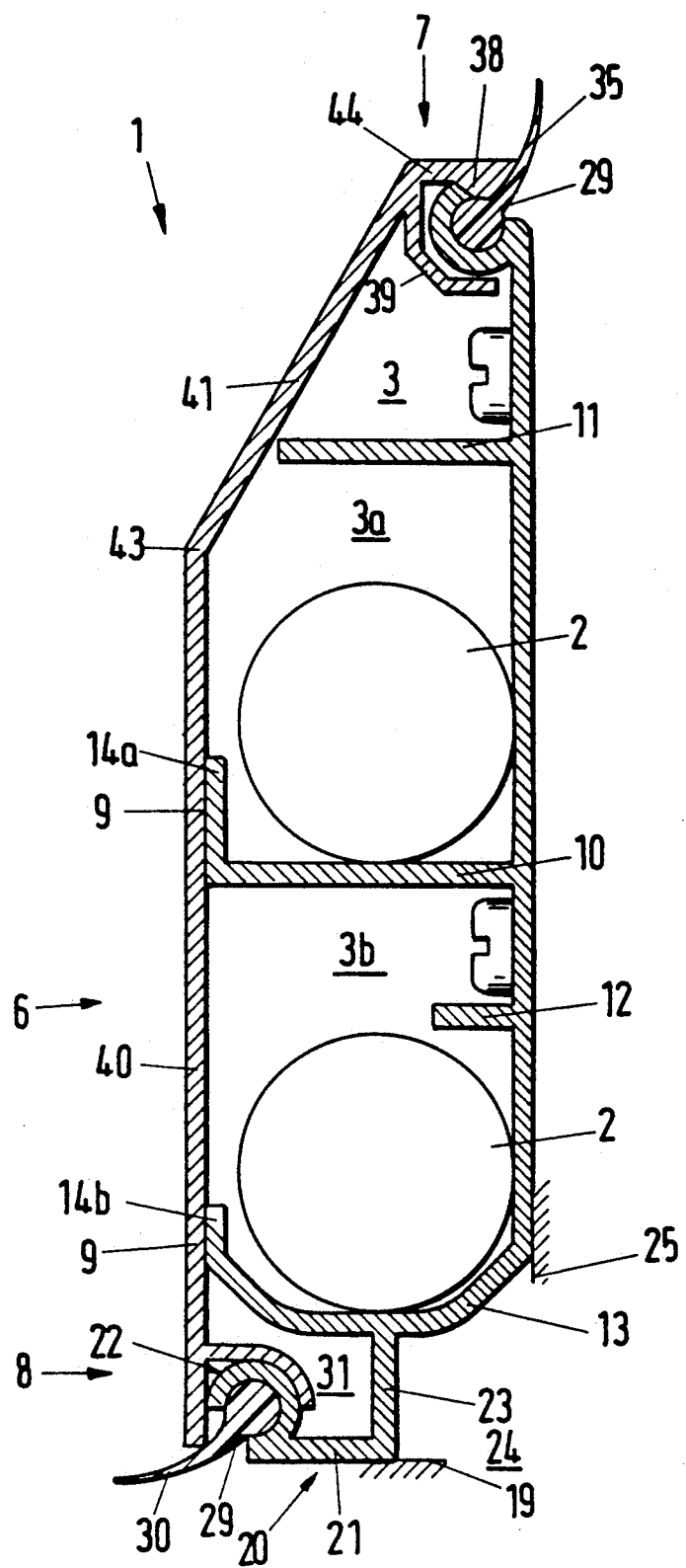
FIG. 2 shows a sectional representation of the installation duct of FIG. 1.

The installation duct 1, shown in greater detail in a sectional representation in FIG. 2, has several supporting walls 10, 11, 12, 13, of which the middle supporting wall 10 and the lower supporting wall 13 present an edge plate 14a, 14b, the outside of which forms the seat 9 for the capping 6. In the embodiment show, the seat 9 at the outside of the edge plate (14a) offers a sealing surface, which forms a gap seal with the opposite surface of the capping 6.

Figure 3:
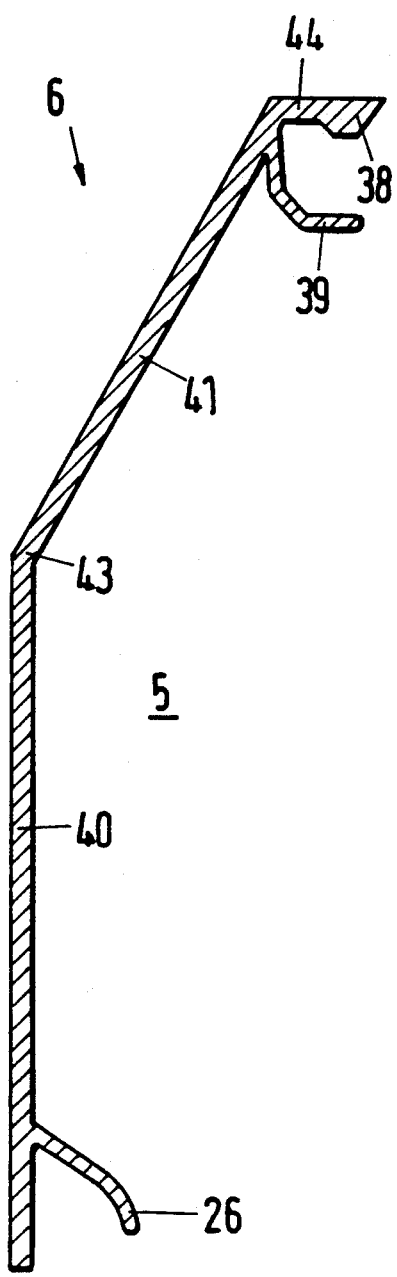
FIG. 3 shows a section through a modified capping in detailed representation, which forms a part of a second installation duct guiding mechanism.
Figure 4:
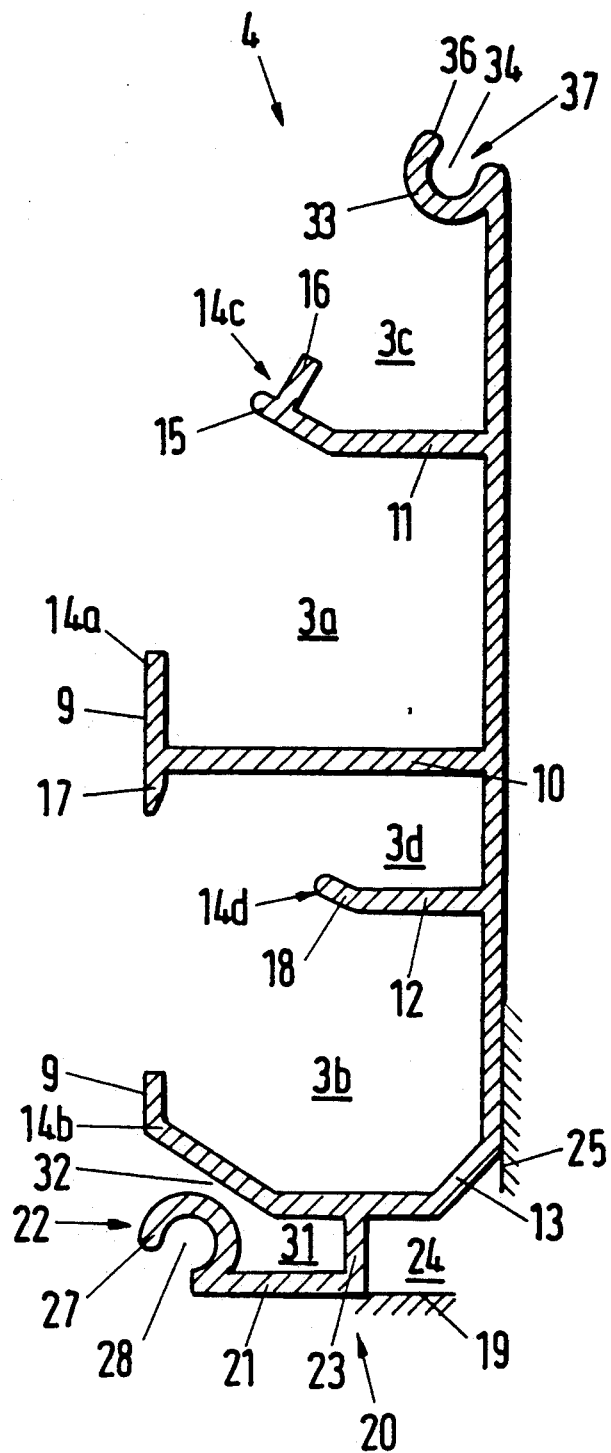
FIG. 4 shows a section through a modified retaining strip of the second installation duct guiding mechanism, also in detailed representation.

FIGS. 3 and 4 show a second, preferred embodiment of an inventive installation duct with a capping 6 and a retaining strip 4, which presents supporting walls 10, 11, 12, 13 of very different designs for accommodating different utility lines, which are not shown, in special ducts 3a, 3b, 3c and 3d, which differ from one another in height and width. The supporting walls 10, 11, 12, 13 have different edge plates 14a, 14b, 14c and 14d, which are set on edge.

As edge plate 14c, the upper supporting wall 11 advisably has a support 15, which is aligned perpendicularly to the capping 6 and with which an additional bearing surface is created for the capping 6. In the region of the supporting part 15, the supporting wall 11 includes a hook-shaped bearing surface part 16, with which the utility lines 2 are secured in their operating position in the duct 3.

At the edge plate 14a, the middle supporting wall 10 has a leg 17, which protrudes downwards (FIG. 4) and which, if necessary, forms a drip stone, so that a supporting wall 12, which is underneath and shorter than the middle supporting wall 10, is protected against moisture for the formation of a duct 3d, for example, for electrical cables. For this purpose, the edge plate 14d of the supporting wall 12 is constructed as a flat form arc 18.

In the embodiment of FIG. 4 that is shown, the set-on-edge edge plate 14b of the lower supporting wall 13 is also constructed as a seat 9, optionally with aligning function for the capping 6, the supporting walls 10 and 13 protruding by an equal amount from the retaining strip 4.

In the region of the lower supporting wall 13 of the retaining strip 4 of both embodiments, an L-shaped supporting plate 20, which juts out to the floor 19, is disposed. An abutment 22 of the lower connector 8 is formed in the front region of the supporting plate 20 at leg 21, which is parallel to the floor. In an advantageous development, the perpendicular leg 23 of the supporting plate 20 is disposed in the center below the lower supporting wall 13. With that, free space 24 is created for the installation and can compensate for any unevenesses that are present.

The abutment 22, which is formed at the leg 21 of the supporting plate 20 that is parallel to the floor, can be clasped at the top by a latch clasp 26 (FIG. 3), which is conformal at least regionally. The abutment 22 is advantageously constructed as a hollow section plate 27, which, in the operating position of the installation duct 1, has an clamping space 28, which is open on the floor side, for accommodating a ridge 29 of a sealing lip 30 (FIG. 2). The hollow section plate 27 advisably has an annular profile.

In the embodiment of FIGS. 2 and 4, the abutment 22 is at such a distance from the lower supporting wall 13 over an appropriate length of the leg 23 of the supporting plate 20, that a gap 32, which ends in the accommodating space 31, remains for the passage of the latch clasp 26 either with clearance (FIG. 2) or approximately without clearance.

The upper connector 7 is formed by an upper hollow section plate 33 at the retaining strip 4, which, in the operating position, has a clamping space 34, which is open towards the top, for accommodating the ridge 29 of an upper sealing lip 35. An edge 36 of the opening slot 37 (FIG. 4) of the clamping space 34 forms a locking abutment for a ridge-shaped locking shoulder 38 at the capping 6. Advisably, the upper hollow section plate 33 has an annular profile, which is undergrasped by a guide plate 39 of the capping 6.

With that, the capping 6 (FIG. 3) as a whole can be connected with the retaining strip 4 by way of the upper and lower connectors 7, 8, so that the capping 6 rests against the respective seats 9 of the retaining strip 4, optionally under a low tension resulting from a slight deformation. With a lower wall part 40, which is parallel to the wall, the capping 6 rests against the seats 9 and clasps a desk-shaped, inclined upper wall part 41, which extends over the upper third to the upper half of the overall height of the capping 6.

Alternatively, one of the edge plates 14a of the supporting wall can also rest against the capping 6 in the transition region 43 (FIG. 3) from the lower part 40 of the wall to the upper part 41 of the wall and, at the same time, form a bearing surface, the shape of which is adapted to the transition region 43.

The upper end of the capping 6 forms an upper end wall part 44, which is aligned perpendicularly to the bearing surface 25 of the retaining strip 4 and on the underside of which the ridge-shaped locking shoulder 38 is located.

What is claimed is:

1. A utility duct for elongated utility members and which is mountable on a wall structure, said utility duct comprising:
    a retaining strip adaptable to be disposed on said wall structure;
    a capping member;
    upper and lower connector means connecting said capping member to said retaining strip to thereby form an internal duct passage for said utility members;
    said upper connector means which connects said capping member to said retaining strip comprising a hollow structural element on an upper end portion of said retaining strip, said hollow structural element having a slot opening facing generally upwardly, and an upper lip sealing member having a lower end formed with a ridge disposed in said hollow structural element, an intermediate part passing through said slot opening, and an upper end extending from said intermediate and;
    said retaining strip having a plurality of supporting walls which together with the retaining strip form gutter-shaped channels for supporting said utility members;
    at least one of said supporting walls having an outer end formed as a seat which seats against said capping member when said capping member is mounted on said retaining strip by said upper and lower connector means.

2. A utility duct according to claim 1, wherein said slot opening has an edge portion forming a locking abutment, said capping member having an upper end portion formed with a locking shoulder which defines part of said upper connecting means, said locking shoulder lockingly engaging said locking abutment.

3. A utility duct according to claim 2, wherein said hollow structural element has an arcuate cross-sectional configuration, said capping member having a grasping projection which underlies and grasps said arcuate hollow structural element.

4. A utility duct according to claim 2, wherein said retaining strip has a rear panel for disposing against said wall structure, said capping member having an upper end wall which extends generally perpendicularly to said rear panel, said latching shoulder being integrally formed on the underside of said upper end wall.

5. A utility duct for elongated utility members and which is mountable on a wall structure, said utility duct comprising:
    a retaining strip adapted to be disposed on said wall structure;
    a capping member;
    upper and lower connector means connecting said capping member to said retaining strip to thereby form an internal duct passage for said utility members;
    said retaining strip having a plurality of supporting walls which together with the retaining strip form gutter-shaped channels for supporting said utility members;
    the lowest one of said plurality of supporting walls having an outer end formed as a seat which seats against said capping member when said capping member is mounted on said retaining strip by said upper and lower connector means;
    an L-shaped support member underlying said lowest supporting wall, said L-shaped support member having a generally vertical leg extending from said lowest supporting wall and a generally horizontal leg, said lower connecting means which connects said capping member to said retaining strip being at least partially formed on said horizontal leg;
    said lower connector means which connects said capping member to said retaining strip comprising a hollow structural element on an end of said horizontal leg of said L-shaped member, said lower connector means further comprising a latch clasp on said capping member which engages said hollow structural element;
    said hollow structural element having an opening facing said floor structure, and a lower lip sealing member having one end formed with a ridge disposed in said hollow structural element, an intermediate part passing through said opening, and a lower end disposed against said floor structure.

6. A utility duct for elongated utility members and which is mountable on a wall structure, said utility duct comprising:
    a retaining strip adapted to be disposed on said wall structure;
    a capping member;
    upper and lower connector means connecting said capping member to said retaining strip to thereby form an internal duct passage for said utility members;
    said retaining strip having a plurality of supporting walls which together with the retaining strip form gutter-shaped channels for supporting said utility members;
    the lowest one of said plurality of supporting walls having an outer end formed as a seat which seats against said capping member when said capping member is mounted on said retaining strip by said upper and lower connector means;
    an L-shaped support member underlying said lowest supporting wall, said L-shaped support member having a generally vertical leg extending from said lowest supporting wall and a generally horizontal leg, said lower connecting means which connects said capping member to said retaining strip being at least partially formed on said horizontal leg;

said lower connector means which connects said capping member to said retaining strip comprising a hollow structural element on an end of said horizontal leg of said L-shaped member, said lower connector means further comprising a latch clasp on said capping member which engages said hollow structural element;
said hollow structural element underlying said lowest supporting wall and being spaced from said lowest supporting wall, said latch clasp of said capping member being received in the space between said lowest supporting wall and said underlying hollow structural element.

* * * * *